May 24, 1938. B. S. AIKMAN 2,118,390
BRAKE CONTROL MEANS
Filed July 28, 1936 2 Sheets-Sheet 1
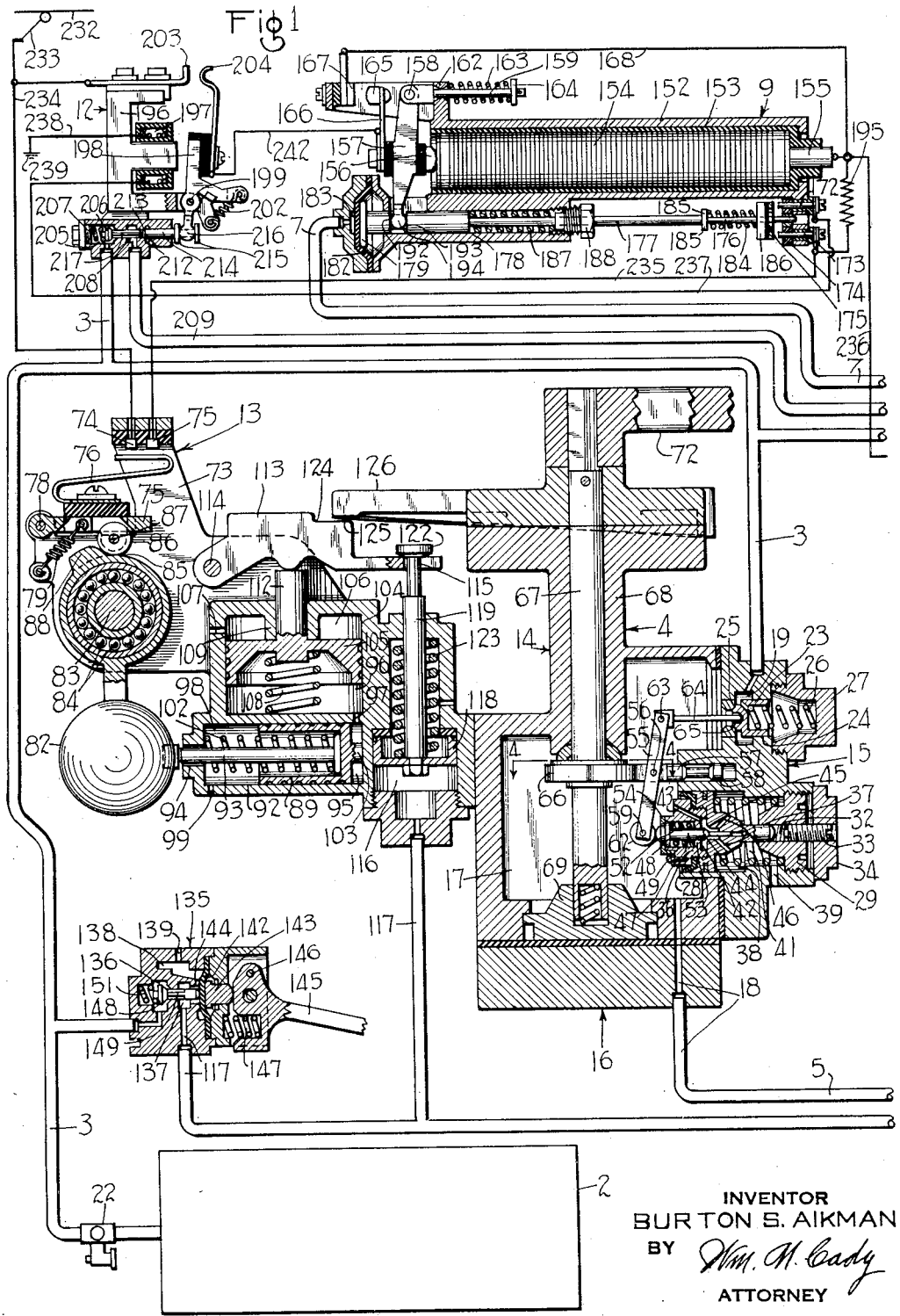
INVENTOR
BURTON S. AIKMAN
BY Wm. M. Cady
ATTORNEY

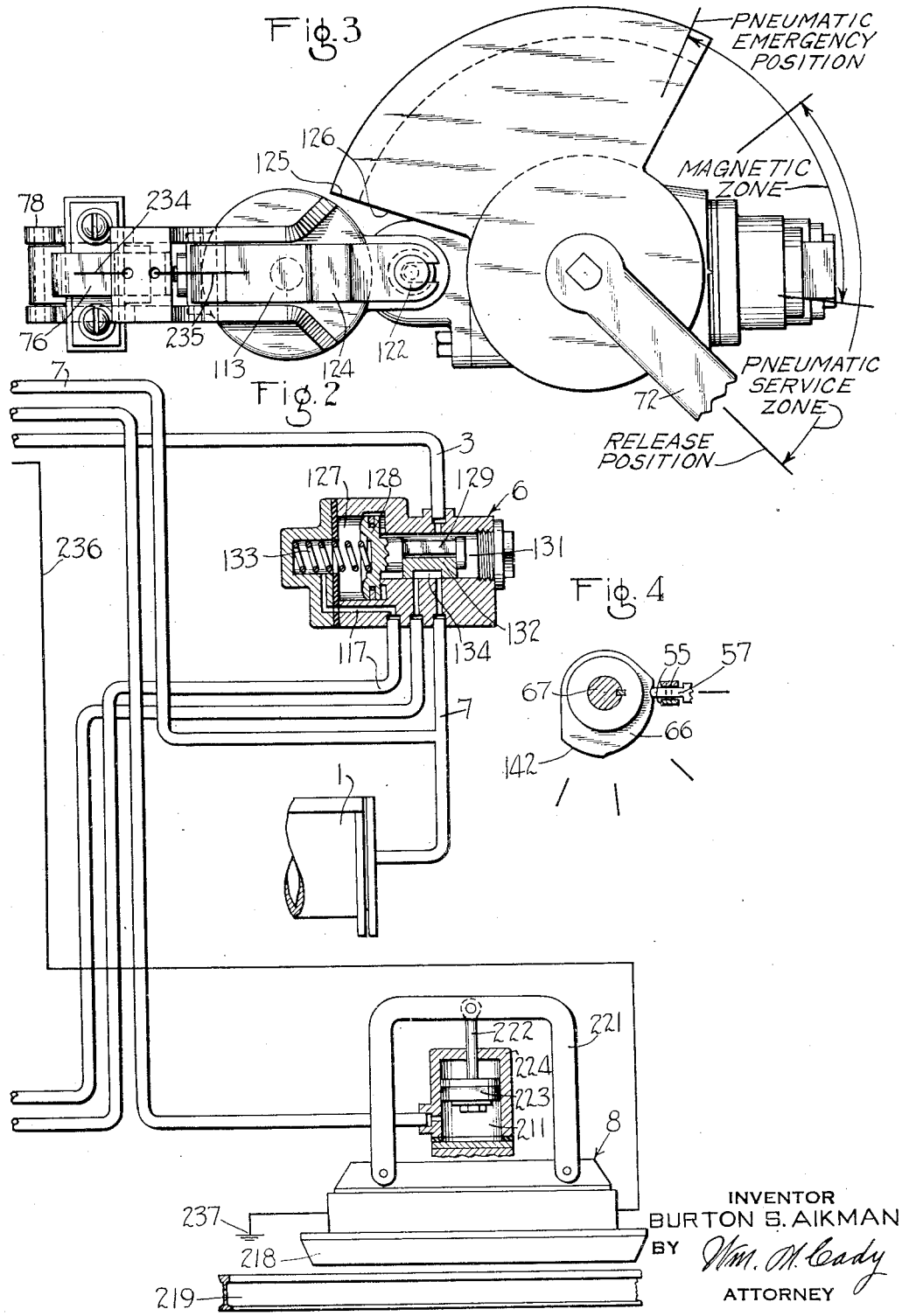

Patented May 24, 1938

2,118,390

UNITED STATES PATENT OFFICE 2,118,390

BRAKE CONTROL MEANS

Burton S. Aikman, Wilkinsburg, Pa., assignor to The Westinghouse Air Brake Company, Wilmerding, Pa., a corporation of Pennsylvania Application July 28, 1936, Serial No. 92,965

22 Claims. (Cl. 303—3)

My invention relates to brake control systems and more particularly to such systems employing a plurality of braking means including a magnetic track shoe braking means.

One object of my invention is the provision of control means for magnetic track shoe brakes in which the track shoe windings are slightly energized before the shoes are brought into engagement with the track rail.

Another object of my invention is to control the degree of energization of the magnetic track shoe brakes in accordance with variations in straight air pipe pressure.

A further object of my invention is to so control the track shoe raising cylinder as to cause the track shoes to be lowered into engagement with the rail at the time the braking current is supplied to the shoe and to be raised from engagement with the rail at the time the energizing circuit for the track shoe is interrupted.

Another object of my invention is the provision of means for automatically interrupting the energization of the magnetic track shoe when the vehicle comes to rest or the rate of retardation of the vehicle decreases to a predetermined low value, to prevent the windings thereof from burning out or becoming overheated.

A further object of my invention is the provision of means responsive to the rate of retardation of the vehicle for controlling the application and release of the magnetic track shoe braking means after the brake controller device is moved to its brake applying position.

A still further object of my invention is the provision of means responsive to movement of the brake controller device to a brake applying position for effecting the initial application of the track shoe braking means independently of the rate of retardation of the vehicle.

Other objects and advantages of my invention will appear from the following description, reference being had to the accompanying drawings in which Figs. 1 and 2, taken together, are a diagrammatic view of apparatus and circuits comprising one preferred embodiment of the invention, Fig. 3 is a plan view of the brake valve device shown in Fig. 1, and Fig. 4 is a sectional view taken on the line 4—4 in Fig. 1.

Referring to the drawings, my invention contemplates the use of a fluid pressure braking means comprising a brake cylinder 1 that is supplied with fluid under pressure from the main reservoir 2 through main reservoir pipe 3, as controlled by the brake valve device 4, through straight air pipe 5, the automatic valve device 6 and brake cylinder pipe 7. A magnetic track braking means is also provided comprising the track shoe 8 that is controlled by the resistor device 9 and the contactor 12 in accordance with the pressure in the brake cylinder pipe 7 as controlled by the brake valve device 4. The magnetic track brake is controlled by the resistor unit device 9 in accordance with the pressure in the brake cylinder pipe 7, by a contactor 12 and an inertia controlled pilot switch device 13 that is carried on the brake valve device 4.

The brake valve device 4 comprises a casing having a main body portion 14, a self-lapping valve portion 15 and a base or bracket portion 16, the three portions together defining a pressure chamber 17 that is in open communication with the brake cylinder 1 through straight air passage and pipe 18, the automatic valve device 6 and brake cylinder pipe 7.

The self-lapping valve portion 15 is provided with a supply valve chamber 19 to which a feed valve device 22 of the usual type supplies fluid under pressure at a reduced pressure from the main reservoir 2 through the main reservoir pipe and passage 3. A supply valve 23 is provided in the valve chamber 19 and is slidably disposed within a bore 24 in the casing to engage a seat 25 provided in the valve portion of the casing. The supply valve 23 is subject to the pressure of a spring 26, one end of which engages the valve and the other end of which engages a nut 27 screw-threadedly attached within a bore in the valve portion of the casing.

The self-lapping valve portion or section of the casing 14 is also provided with a cylinder 28 which is open at one end to the pressure chamber 17, the other end of the cylinder being closed by an adjusting member 29 screw-threadedly attached within a bore in the self-lapping valve casing portion. The adjusting member 29 is provided with a central bore 32 which, at its outer end, is adapted to receive a screw 33 for attaching a cap member 34.

Operatively mounted in the cylinder 28, adjacent its open end, is a movable abutment in the form of a piston 36 having a stem 37 which is slidably guided by the adjusting member 29 within the inner end of a bore 32. At one end of the piston 36 is a chamber 38 which is constantly open to the atmosphere through an exhaust passage and port 39. A coil spring 41 is contained in the chamber 38 and is interposed between and engages the inner face of the piston 36 and the inner face of the adjusting member 29.

A release valve chamber 42 is provided within the piston 36 that is in open communication with the pressure chamber 17 through a passage 43. A release valve 44 is contained within the valve chamber 42 and is adapted to seat on the valve seat 45 formed on the piston and which is operative to control communication between the valve chamber 42 and the chamber 38 through connecting passages 46. The release valve is provided with a stem 47, the small end of which slides within a bore in the stem of the piston 36 and the larger end of which is provided with a collar 48 which slidably engages the piston within a central bore 49 and is subject to the pressure of the release valve spring 52 interposed between the engaging collar 48 and the annular flange 53 on the piston. Outward movement of the release valve relative to the piston 36 is limited by the collar 48 which engages a stop flange 54 that is secured to the piston 36.

A mechanism is provided for controlling the operation of the supply valve 23 and the release valve 42 comprising spaced levers 55, that are pivotally mounted intermediate their ends on a pin 56, supported in a plunger 57 that is slidably guided within a bore 58 in the casing of the self-lapping valve portion 15.

The lower end of the spaced levers 55 are connected together by a pin 59 which is loosely mounted within a roller 62 that is adapted to operatively engage the outer end of the release valve stem 47. The upper end of the spaced levers 55 are connected together by a pin 63 to which one end of the operating rod 64 is pivotally mounted, the opposite end of the rod 64 operatively engaging the supply valve 23 within a recess 65 formed in its face. For the purpose of operating the plunger 57 toward the right is provided an operating cam 66 mounted upon a shaft 67 that is carried in an upper bearing 68 and in a lower bearing 69, and is arranged to be operated by the brake valve handle 72. As the handle 72 is moved progressively from its release position toward full service position the cam 66 forces the plunger 57 progressively toward the right.

It will be appreciated that the force of the release valve spring 52 is less than the force of the supply valve spring 26, which is less than the force of the regulating spring 41. When the cam 66 and the plunger 57 are in their release positions, as shown in Fig. 1, the spring 26 forces the supply valve 23 toward the left to its seated position and the spring 52 forces the release valve 44 toward the left to its unseated position.

The inertia controlled pilot switch device 13 is mounted on a bracket 73 supported from the body portion 14 of the brake valve device 4 and comprises fixed contact members 74 and 75 that are adapted to be engaged by a movable contact member 76 that is carried by a lever 77 mounted on a pin 78 that is attached to the bracket 73. A spring 79 is provided for urging the lever 77 and the switch contact member 76 downwardly to normally maintain the contact member 76 out of engagement with the contact members 74 and 75. An inertia pendulum 82 is provided that is mounted on a hub 83 extending from the bracket 73, the ball bearings 84 providing easy movement of the pendulum in accordance with the rate of retardation of the vehicle to present a cam face 85 against a roller 86 that is mounted on a pivot pin 87 carried by the lever 77. A raised portion 88 is provided for raising the roller 86, the lever 77 and the switch contact member 76 upon movement of the pendulum 82 toward the left from its vertical or illustrated position.

A time limiting mechanism is provided for urging the pendulum 82 toward the left for a short interval of time upon movement of the brake valve handle 72 to a brake applying position. This mechanism includes a movable piston 89 positioned within a bore 92 provided in the bracket casing and having a stem 93 extending through an opening 94 in one end of the casing and adapted to engage the pendulum 82. The piston 89 divides the bore 92 into a chamber 95 that is in constant communication with a chamber 96 through port 97, and a chamber 98 that is in constant communication with the atmosphere through port 99. A spring 102 is provided within the chamber 98, one end of which engages the outer end of the bore 92 and the other end of which engages one side of the piston 92 to force the piston toward the right until the stop member 103 thereon engages the opposite end of the bore.

A vertical bore 104 is provided in the casing above the bore 92, containing a piston 105 dividing the bore into the aforenamed chamber 96 and a chamber 106 that is in communication with the atmosphere through port 107. A spring 108 is provided within the chamber 96, the lower end of which engages a partition in the casing and the upper end of which engages the piston 105 to force it upwardly against a stop 109 extending downwardly from the upper casing wall. The piston 105 is provided with a stem 112 extending upwardly through an opening in the upper casing wall and adapted to engage a lever 113 that is pivotally mounted on a pin 114 on the bracket 73 and in the opposite end of which is an opening 115.

A piston chamber 116 is also provided in the bracket casing that is in constant communication with a safety control pipe 117 and which contains a piston 118 having a stem 119 extending upwardly therefrom through an opening in the upper casing wall and having a reduced portion that extends through the opening 115 in the lever 113, and provided with a head 122 on the upper end thereof for a purpose to be later explained. A spring 123 is provided about the stem 119, the upper end of which engages the casing wall and the lower end of which engages the piston 118 for urging the piston 118 and the stem 119 downwardly upon the release of fluid under pressure from the piston chamber 116. The lever 113 is provided with a flat portion 124 that is so positioned as to be adapted to be engaged by a cam surface 125 on the under side of a segment 126 mounted on the shaft 67 and rotatable therewith upon movement of the brake valve handle 72.

The automatic valve device 6 comprises a casing providing a piston chamber 127 containing a piston 128 having a stem 129, extending into a valve chamber 131 on the opposite side of the piston 128, that is in constant communication with a main reservoir pipe 3 and which contains a slide valve 132 operatively connected to the stem 129. A spring 133 is provided within the piston chamber 127 for normally urging the piston 128 and the slide valve 132 to their illustrated positions in which a cavity 134 in the slide valve 132 effects communication between the straight air pipe 5 and the brake cylinder pipe 7.

A foot valve device 135 is provided having a casing providing a valve chamber 136 that is in constant communication with a main reservoir pipe 3, a chamber 137 that is in constant communication with the safety control pipe 117 and a chamber 138 that is in constant communication with the atmosphere through exhaust port 139. A diaphragm valve 142 is provided within the chamber 138 and is adapted to be forced by a follower 143 against its rib seat 144 to close communication from the safety control pipe and chamber 137 to the atmosphere through chamber 138 and exhaust port 139. A foot lever 145 is provided pivotally connected to the casing by a pin 146 and urged in a counterclockwise direction by a spring 147 one end of which engages the lever 145 and the other end of which engages the casing of the foot valve device. A valve 148 is provided within the chamber 136 and is provided with a stem 149 extending through the chamber 137 into engagement with the diaphragm valve 142, the valve 142 acting against the stem 149 to force the valve 148 from its seat against the bias of a spring 151 provided within the chamber 136 when the valve 142 is in its seated position. Upon the release of pressure from the lever 145, the spring 147 urges the lever upwardly, thus relieving pressure against the follower 143 and permitting the spring 151 to force the valve 143 to its seat to close communication between the main reservoir pipe 3 and the safety control pipe 117, the stem 149 acting at the same time to force the diaphragm valve 142 from its seat to effect communication between the safety control pipe 117 and the atmosphere through chambers 137 and 138.

The resistor device 9 comprises a tubular casing 152 having a lining 153 of insulating material therein containing a stack of wafers 154 of conducting material, such as carbon, connected between the fixed terminal 155 at the right hand end and a movable pressure terminal 156, carried by a lever 157 that is pivotally mounted on a pin 158 carried at one end of a rod 159 extending through an opening in a bracket 162 that extends upwardly from the casing 153. A spring 163 is provided about the rod 159, one end of which engages the bracket 162 and the other end of which engages a collar 164 carried on the rod 159 for urging the rod and pivot pin 158 toward the right to their illustrated positions, so long as the pressure on the spring 163 is below a predetermined value. A contact member 165 that is electrically connected to the terminal 156 is carried by the resilient support 166 and is adapted to engage the fixed contact member 167 that is connected by conductor 168 to the terminal 155 for a purpose to be later explained.

On the under side of the casing 152 a pressure operated switch is provided comprising fixed contact members 172 and 173 that are carried by a supporting bracket 174 and insulated from the casing structure, and a movable contact member 175 that is carried by a stem 176, the smaller end of which is guided within a bore in the bracket 174 and the larger end of which is guided within a bore in a stem 177 that is carried in a bore 178 within the casing structure and terminates in a diaphragm follower 179 that engages one side of the diaphragm 182 on the opposite side of which is provided a diaphragm chamber 183 that is in constant communication with a brake cylinder pipe 7. A spring 184 is provided about the rod 176, one end of which engages a collar 185 on the end of the stem 177 and the other end of which engages the support 186 carrying the movable contact member 175 to provide a resilient connection between the contact member 175 and the stem 177 upon movement thereof to a switch closing position. A spring 187 is provided within the bore 178, the right hand end of which engages a nut 188 that is screw-threadedly attached within the end of the bore 178, and the other end of which engages in an enlarged portion of the stem 177 to urge the stem toward the left. A portion of the stem is reduced to form shoulders 192 and 193 to engage opposite sides of the bifurcated end 194 of the lever 157 for actuating the lever and the pressure terminal 156 upon movement of the same. A resistor 195 is permanently connected between the switch terminal 173 and the common power terminal 155.

The contactor device 12 comprises a magnetic core consisting of the fixed portion 196 and a movable armature portion 198 pivotally connected thereto by a pin 199, and adapted to be actuated thereby upon the energization of a winding 197, to cause engagement of the movable contact member 204 with a fixed contact member 203. A spring 202 normally urges the armature member and the contact member 204 toward their illustrated positions. The core portion 196 is mounted upon a casing providing a valve chamber 205 containing a valve 206 that is urged toward its seat by a spring 207 therein to close communication between the chamber 205 and a chamber 208 that is in constant communication with a pipe 209 and a piston chamber 211 of the track shoe device 8. An exhaust valve chamber is also provided that is in constant communication with the atmosphere through exhaust port 212 and which contains a valve 213 having a valve stem 214 provided with collars 215 for engaging the opposite sides of the bifurcated lower end 216 of the armature 198. The valve 206 is provided with a stem 217 for engaging the valve 213. In the deenergized condition of the contactor 12 the spring 202 urges the armature 198 to its illustrated position, the lower end 216 thereof biasing the valve 213 to its seat and the valve 206 from its seat against the bias of the spring 207, thus effecting communication from the main reservoir pipe 3 to the piston chamber 211 of the track shoe device 8.

The track shoe device 8 comprises a track shoe 218 for engaging the track rail 219 and is normally held suspended above the track rail by the supporting bracket 221, the piston stem 222 and the piston 223 in the aforementioned piston chamber 211 provided in a casing 224 carried on the car or truck structure.

*Charging the system*

The system is charged by the flow of fluid under pressure from the main reservoir 2 as supplied by the feed valve device 22 at a reduced pressure to the main reservoir pipe 3, to charge the supply valve chamber 19 on the brake valve device 4. Fluid under pressure also flows from the main reservoir pipe 3 through chambers 205 and 208 of the contactor device 12, pipe 209, to the piston chamber 211 of the track shoe raising cylinder 224, thus forcing the piston 223 and the track shoe 218 upwardly to disengage the track shoe from the rail.

To charge the system it is necessary that the operator maintain pressure on the foot lever 145 urging the lever downwardly against the bias of the spring 147 to its illustrated position, thus forcing the diaphragm valve 142 against its rib seat 144 to close communication between the safety control pipe 117 and the atmosphere and to unseat the valve 148 to effect communication between the main reservoir pipe 3 and the safety control pipe 117. Fluid under pressure thus flows from the main reservoir pipe 3 to the safety control pipe 117 and to the piston chamber 127 of the automatic valve device 6, the combined pressure within the piston chamber 127 and the force of the spring 133 forces the piston 128 and the slide valve 132 to the right or to their illustrated positions. Fluid under pressure also flows from the safety control pipe 117 to the piston chamber 116 of a time limiting control mechanism for controlling the inertia pilot switch, thus forcing the piston 118 upwardly against the bias of the spring 123 thus reducing pressure on the upper side of the lever 113 and permitting the spring 108 to force the piston 105, the stem 112 and the lever 113 upwardly to their illustrated positions. Fluid under pressure also flows from the main reservoir pipe 3 to charge the slide valve chamber 131 of the automatic valve device 6.

*Service application of the brakes*

If the operator wishes to make a service application of the brakes the handle 72 of the brake valve device 4 is moved from its release position an amount depending upon the desired degree of application of the brakes. Upon the initial movement of the handle from its release position the sloping surface of the cam 66 moves against the plunger 57, forcing the plunger toward the right. The first part of this movement effects a compression of the release valve spring 52 and forces the release valve 44 to its seat, closing communication between the pressure chamber 17 and the atmosphere through passages 43, 46 and 39. Further movement of the plunger 57 toward the right causes the spaced levers 55 to pivot about their lower end, further movement of the roller 62 being prevented by the stiffness of the regulating spring 41, thus causing the rod 64 to force the supply valve 23 against the compression of the supply valve spring 26 to open communication between the main reservoir pipe 3 and the pressure chamber 17 through the supply valve chamber 19, thus supplying fluid under pressure from the main reservoir 2 to the pressure chamber 17 and to the brake cylinder 1 through straight air pipe 5, the cavity 134 in the slide valve 132 of the automatic valve device 6 in its illustrated position, and brake cylinder pipe 7. The pressure established in the pressure chamber 17, and in the brake cylinder 1, is dependent upon the degree of movement of the operating lever 72 and of the plunger 57 from their release positions, since, when the pressure within the chamber 17 is increased due to the flow of fluid thereto through the supply valve chamber 19 a like pressure is exerted on the chamber side of the piston 36 in opposition to the pressure exerted by the regulating spring 41. This pressure continues to build up until it becomes sufficient to force the piston 36 toward the right, thus relieving the pressure on the roller 62 and permitting the supply valve spring 26 to force a rod 64 toward the left, pivoting the lever 55 about the pivot 56 and moving the supply valve 23 into engagement with its seat 25.

The amount of pressure on the chamber side of the piston 36 necessary to effect sufficient movement of the piston 36 to cause a supply valve 23 to seat is dependent upon the amount of movement of the operating lever 72 and of the plunger 57 from their release positions. The greater the movement of the operating lever 72 from its release position the greater will be the amount of movement of the pivot pin 56 toward the right, and, consequently, the greater will be the compression of the regulating spring 41 necessary to permit movement of the lever 55 and of the rod 64 to effect the seating of the supply valve 23. It will be apparent therefore, that the brake valve device is self-lapping on a pressure basis, the degree of fluid pressure within the pressure chamber 17 necessary to effect the movement of the valve to lap position being dependent upon the degree of movement of the operating lever 72 from its release position.

As the lever 72 of the brake valve device 4 is moved to any position within the pneumatic service zone the surface 125 of the segment 126 engages the surface 124 on the lever 113, thus causing the lever to move in a clockwise direction about the pin 114 and to force the stem 112 and the piston 105 downwardly against the bias of the spring 108. Fluid under pressure in the chamber 96 is thus forced through the port 97 into the piston chamber 95 to force the piston 89 and the stem 93 toward the left, the end of the stem 93 engaging the pendulum 82 and forcing it to move in a clockwise direction about the central hub 83, thus causing the raised surface of the cam 68 acting against the roller 86 to move the lever 77 in a counterclockwise direction and cause engagement of the switch contact member 76 with the contact members 74 and 75. A tickler or magnetizing circuit is thus completed from the over-head line conductor 232 through trolley 233, conductor 234, the switch contact members 74, 75 and 76, and conductor 235, to the terminal 173 of the pressure operated switch on the resistor device 9 through resistor 195, conductor 236, and the winding of the track shoe 218, to ground at 237. The resistor 195 is so designed as to permit the supply of magnetizing current only to the brake shoe 218, and is insufficient to cause an appreciable braking action.

As the pressure in the brake cylinder pipe 7 and in the diaphragm chamber 183 of the pressure operated switch builds up to a predetermined low value, the follower 179 and the stem 177 are moved toward the right to cause engagement of the switch contact member 175 with the contact members 172 and 174 to close a circuit from the over-head line conductor 232, as above traced, to the terminal of the contact member 173, through switch contact members 173, 175, and 172, the conductor 237 through the winding 197 of the contactor 12, and conductor 238 to ground at 239, thus causing movement of the armature 198 in a counterclockwise direction about the pivot pin 199 to effect engagement of the contact member 204 with contact member 203 and movement of the bifurcated lower end of the armature 216 toward the right, thus permitting the valve 206 to be moved to the right to its seat and the valve 213 to be moved to the right from its seat to close communication as above described between the main reservoir pipe 3 and the piston chamber 211 of the track shoe raising cylinder 224 and to permit the release of fluid under pressure from the piston chamber 211 through pipe 209 and exhaust port 212.

Engagement of the contact members 204 and 203 completes a braking circuit from the over-head line conductor 232, through trolley 233, contact members 203 and 204, conductor 242, to the terminal 156 of the stack of carbon pile wafers 154, through the carbon pile stack to the terminal 155, the conductor 236, the winding of the track shoe magnet and to ground at 237. It will be noted that a portion of the above traced circuit through the carbon pile resistor 154 is in parallel circuit relation with the said portion of the circuit through the resistor 195. As the pressure in the brake cylinder 1 and in brake cylinder pipe 7 and diaphragm chamber 183 builds up, the stem 177 is urged further toward the right against the bias of the spring 187, thus moving the lever 157 further in a counterclockwise direction about the pivot pin 158 to bring a greater pressure on the carbon pile stack 154, and thus to decrease the resistance of the carbon pile stack to thereby increase the current flow through the winding of the track shoe 218 to provide a braking current that is substantially proportional to brake cylinder pressure. If the pressure in the brake cylinder and in the diaphragm chamber 183 builds up to a sufficiently high value, thus creating a sufficiently high pressure of the terminal member 156 on the carbon pile stack, the force of the spring 163 will no longer be sufficient to maintain the rod 159 and the pivot pin 158 in their illustrated positions, and the lever 157 will move in a counterclockwise direction about the terminal 156 as a fulcrum, causing the contact member 165 to engage the contact member 167 and close a circuit in shunt relation to the carbon pile stack 154, through contact members 165, 167, conductor 166, to the terminal 155, thus effecting maximum energization of the track brake shoe.

The initial movement of the pendulum 82 toward the left, caused by movement of the piston 89 and the stem 93, is of short time duration due to the leakage of fluid under pressure past the piston 89, this being so arranged that after a short time interval the pendulum 82 will no longer be prevented by the stem 93 again resuming its illustrated position.

The retardation of the vehicle causes the pendulum 82 to be moved in a clockwise direction, a predetermined minimum rate of retardation being required to cause the roller 86 to ride upon the cam surface 88 sufficiently to maintain the switch contact member 76 in engagement with the switch contact members 74 and 75, as above described, to permit the energization of the track shoe brake. So long as the rate of retardation of the vehicle is sufficient to maintain the switch contact member 76 in its circuit closing position, and so long as the pressure in the brake cylinder is sufficient to maintain the pressure operated switch contact member 175 in its circuit closing position, the winding of the track shoe 218 will remain energized. However, upon a decrease in the rate of retardation of the vehicle below the predetermined minimum rate, or upon the complete stopping of the vehicle the pendulum 82 will move to substantially its illustrated position, permitting the switch contact member 76 to move out of engagement with the contact members 74 and 75. Upon the disengagement of contact member 76 from contact members 74 and 75, the contactor 12 is shifted to open the braking circuit through the winding of the track shoe 218 and cause re-supply of fluid under pressure through pipe 209 to the piston chamber 211 of the track shoe raising cylinder 224 to raise the track shoe out of contact with the rail 219, the track shoe brake being thus released.

It will be evident, and it is so intended, that with the energizing circuit for winding 197 of contactor 12 through the inertia controlled pilot switch 13 interrupted, the current supplied to the contactor winding 197 from the overhead conductor 232 by way of contact members 203 and 204 of contactor 12, wire 242, resistor 9 or parallel-connected resistor 9 and shunt 168, resistor 195, contact members 173, 186, 172 of the brake cylinder pressure responsive switch, and wire 237 is insufficient to hold the contact members 203 and 204 of the contactor 12 in engagement against the tension of the spring 202 of the contactor.

It will thus be seen that the pressure in the brake cylinder pipe 7 controls both the degree of application of the fluid pressure brakes and the degree of application of the track brake to effect a corresponding increase and decrease in the degree of application of the two brakes, and, that upon the stopping of the vehicle the electric track brake will be deenergized irrespective of whether the lever 72 is moved to release position to release the fluid pressure brakes.

If the operator wishes to release the brakes, the handle 72 is moved to release position, thus moving the cam 66 out of engagement with the plunger 57 and permitting the release valve spring 52 acting against the release valve stem 47 to force the roller 62 and the spaced levers 55 toward the left to unseat the release valve 42 and permit the flow of fluid under pressure from the pressure chamber 17 and the brake cylinder 1 to the atmosphere through passages 43, 46 and 39.

If the brakes are released while the vehicle is in motion and the switch contact member 76 is in engagement with the switch contact members 74 and 75, the winding of the track shoe 218 will remain energized until the brake cylinder pressure has reduced sufficiently to permit movement of the diaphragm 182 by the spring 187 to move the switch contact member 175 out of engagement with the switch contact members 172 and 173, to deenergize the winding 197 of the contactor 12, and permit movement of the armature 198 thereof to its illustrated position by the spring 202. Movement of the armature 198 to cause separation of the contact member 204 from the contact member 203 interrupts the circuit through the winding of the track shoe 218, and, at the same time, causes movement of the valve 213 to its seat to close communication between the piston chamber 211 of the track shoe raising piston 224 and the atmosphere through the exhaust port 212 of the contactor device 12, and causes movement of the valve 206 from its seat to effect the supply of fluid under pressure from the main reservoir pipe 3 through pipe 209 to the piston chamber 211 to raise the track shoe 218 from engagement with the track rail. It will be noted that the operation of the contactor device 12 controls both the energizing circuit to the track shoe and the supply of fluid under pressure to the piston chamber 211 of the track shoe raising cylinder to effect the lowering of the track shoe into engagement with the track rail at the time the track shoe is energized and to effect the raising of the track shoe from engagement with the rail at the time the track shoe is deenergized.

*Emergency application*

An emergency application of the brakes may be effected either by movement of the brake valve lever 72 to pneumatic emergency position (see Fig. 3) in which position the portion 142 (see Fig. 4) of the face of the cam 66 forces the plunger 57 toward the right sufficiently to hold the supply valve 23 unseated and permit full main reservoir pipe pressure to build up in the straight air pipe 5. Emergency application of the brakes may also be effected by relieving pressure on the lever 145 of the foot valve device 135, to release fluid under pressure from the piston chamber 127 of the automatic valve device 6, and from the safety control pipe 117. Upon relieving pressure from the lever 145 of the foot valve device 135, the spring 147 forces the lever 145 in a counter-clockwise direction, thus permitting the spring 151 to force the valve 148 to its seat to close communication between the main reservoir pipe 3 and the safety control pipe 17 and to force the diaphragm valve 142 from its rib seat 144 to effect communication between the safety control pipe 117 and the atmosphere through chambers 137, 138 and the exhaust port 139. Upon the release of fluid under pressure from the piston chamber 127 of the automatic valve device 6 the piston 128 and the slide valve 132 are moved toward the left against the bias of the spring 132 by the greater pressure within the slide valve chamber 131 to effect communication between the main reservoir pipe 3 and the brake cylinder 1 through slide valve chamber 131, past the right hand end of the slide valve 132.

The release of fluid under pressure from the safety control pipe 117 also effects a reduction in pressure in the piston chamber 116 of the time limiting control mechanism associated with the inertia controlled pilot switch 13, thus permitting the spring 123 to force the stem 119 and the piston 118 downwardly. Upon downward movement of the stem 119 the head 122 actuates the lever 113 in a counterclockwise direction about the pivot pin 114, thus forcing the stem 112 and the piston 105 downwardly against the bias of the spring 108 to force fluid under pressure from the piston chamber 96 into the piston chamber 95 and force the piston 89 and the stem 93 toward the left. The force of the stem 93 against the pendulum 82 causes it to move in a clockwise direction about the hub 83, the cam surface 88 engaging the roller 86 and causing the lever 77 to be moved in a counterclockwise direction to effect engagement of the switch contact member 76 with the switch contact members 74 and 75 to close the above traced tickler circuit through the resistor 195 and the winding of the track shoe 218. Upon the increase in brake cylinder pressure the pressure operated switch contact member 175 is forced into engagement with the switch contact members 172 and 173 to operate the contactor 12 to its circuit closing position in the manner above described for service application of the brakes. The carbon pile stack 154 is compressed to increase the energization of the winding of the track shoe 218 in correspondence with the increase in brake cylinder pressure.

While one preferred embodiment of my invention has been illustrated and described, it will be apparent to those skilled in the art that many modifications and changes in the apparatus and circuits illustrated may be made within the spirit of my invention, and I do not wish to be limited otherwise than by the scope of the appended claims.

Having now described my invention, what I claim as new and desire to secure by Letters Patent, is:

1. In a brake equipment for vehicles, in combination, a brake cylinder, magnetic track shoe braking means for engaging the track rail, an electric circuit for energizing said track shoe braking means, manually operable means for applying the brakes, and inertia responsive means responsive to the rate of retardation of the vehicle when the manually operable means is in a brake applying position for maintaining the energizing circuit of said track shoe closed and for interrupting said circuit when the vehicle comes to rest.

2. In a brake equipment for vehicles, in combination, a brake cylinder, magnetic track shoe braking means adapted for engagement with the track rail, manually operable means for effecting the supply of fluid under pressure to said brake cylinder, and means for effecting the energization of said track shoe comprising means responsive to the brake cylinder pressure and inertia means responsive to the rate of retardation of the vehicle, said inertia means being effective to interrupt the track shoe circuit when the vehicle comes to rest.

3. In a brake equipment for vehicles, in combination, a brake cylinder, magnetic track shoe braking means adapted for engagement with the track rail, an electric circuit for energizing said track shoe braking means, manually operable means for effecting the supply of fluid under pressure to the brake cylinder, means responsive to movement of said manually operable means to a brake applying position for initially energizing said track shoe braking means, and inertia responsive means responsive to the rate of retardation of the vehicle when the manually operable means is in a brake applying position for maintaining the energizing circuit for the magnetic track shoe, and for interrupting said circuit when the vehicle comes to rest.

4. In a brake equipment for vehicles, in combination, a brake cylinder, magnetic track shoe braking means adapted for engagement with the track rail, an electric circuit for energizing said track shoe braking means, manually operable means for effecting the supply of fluid under pressure to said brake cylinder, inertia means responsive to the rate of retardation of the vehicle when the manually operable means is in a brake applying position for maintaining said track shoe energizing circuit closed and for interrupting said circuit when the vehicle comes to rest, and a dash pot mechanism responsive to movement of said manually operable means to a brake applying position for initially actuating said inertia means to effect an initial slight energization of said track shoe braking means.

5. In a brake equipment for vehicles, in combination, a brake cylinder, magnetic track shoe braking means adapted for engagement with the track rail, an electric circuit for energizing said track shoe braking means, manually operable means for effecting the supply of fluid under pressure to the brake cylinder, means for closing said electric circuit comprising a contactor responsive to brake cylinder pressure and an inertia switch responsive to the rate of retardation of the vehicle, and means responsive to movement of said manually operable means to a brake applying position for actuating said inertia switch to its circuit closing position and for maintaining it in that position for a short interval of time.

6. In a brake equipment for vehicles in combination, a brake cylinder, magnetic track shoe braking means adapted for engagement with the track rail, an electric circuit for energizing said track shoe braking means, manually operable means for effecting the supply of fluid under pressure to said brake cylinder, a contactor device for controlling said electric circuit, and means for controlling said contactor device comprising a pressure operated switch responsive to brake cylinder pressure and an inertia switch responsive to the rate of retardation of the vehicle.

7. In a brake equipment for vehicles, in combination, a brake cylinder, magnetic track shoe braking means adapted for engagement with the track rail, an electric circuit for energizing said track shoe, manually operable means for effecting the supply of fluid under pressure to said brake cylinder, a contactor device for controlling said electric circuit, means for controlling said contactor device comprising a pressure operated switch responsive to brake cylinder pressure and an inertia switch responsive to the rate of retardation of the vehicle, and means for lowering said track shoe into engagement with the track rail upon operation of said contactor device to effect the supply of a braking current to said track shoe and for raising said track shoe from engagement with the track rail upon operation of said contactor device to interrupt the braking current through said track shoe.

8. In a brake equipment for vehicles, in combination, a brake cylinder, magnetic track shoe braking means adapted for engagement with the track rail, an electric circuit for energizing said track shoe braking means, manually operable means for effecting the supply of fluid under pressure to said brake cylinder, inertia switch means responsive to the rate of retardation of the vehicle for closing a tickler circuit for magnetizing the magnetic track shoe, and means including said inertia switch means for closing a braking circuit for said track shoe braking means upon movement of said manually operable means to a brake applying position, said inertia switch means being effective to interrupt the braking circuit for said magnetic track shoe braking means when the vehicle comes to rest.

9. In a brake equipment for vehicles, in combination, a brake cylinder, magnetic track shoe braking means adapted for engagement with the track rails, manually operable means for effecting the supply of fluid under pressure to said brake cylinder and for establishing a magnetizing circuit for said track shoe, and means responsive to brake cylinder pressure for establishing a braking circuit for said track shoe.

10. In a brake equipment for vehicles, in combination, a brake cylinder, magnetic track shoe braking means adapted for engagement with the track rail, manually operable means for effecting the supply of fluid under pressure to said brake cylinder and for initially effecting the supply of magnetizing current to said track shoe, and means responsive to a predetermined brake cylinder pressure for effecting the supply of a braking current to said track shoe and for thereafter increasing said braking current in accordance with the increase in brake cylinder pressure.

11. In a brake equipment for vehicles, in combination, a brake cylinder, magnetic track shoe braking means adapted for engagement with the track rail, a tickler circuit for supplying magnetizing current to said track shoe, a braking circuit for supplying braking current to said track shoe, manually operable means for effecting the supply of fluid under pressure to said brake cylinder and for initially closing said tickler circuit, means responsive to brake cylinder pressure while said manually operable means is in a brake applying position for effecting, simultaneously, the closing of said braking circuit and the lowering of said track shoe into engagement with the track rail and for effecting, simultaneously, the interruption of said braking circuit and the raising of said track shoe from the rail.

12. In a brake equipment for vehicles, in combination, a brake cylinder, magnetic track shoe braking means adapted for engagement with the track rails, an electric braking circuit for energizing said track shoe, manually operable means for effecting the supply of fluid under pressure to said brake cylinder, and means responsive to brake cylinder pressure for effecting, simultaneously, the closing of said braking circuit and the lowering of said track shoe braking means into contact with the track rail upon an increase in brake cylinder pressure to a predetermined value and for effecting the interruption of said braking circuit and the raising of said track shoe braking means from engagement with the track rail upon the lowering of the brake cylinder pressure to a predetermined minimum value.

13. In a brake equipment for vehicles, in combination, a brake cylinder, magnetic track shoe braking means adapted for engagement with the track rail, an electric circuit for effecting the supply of a magnetizing current only to said track shoe braking means and an electric braking circuit for controlling the supply of braking current to said track shoe braking means, manually operable means for effecting the supply of fluid under pressure to said brake cylinder, pressure responsive means subject to a predetermined low brake cylinder pressure for closing said braking circuit, and a rheostat in said braking circuit effective upon an increase in brake cylinder pressure above said predetermined low value for controlling said braking current for increasing the track shoe braking effort in accordance with the increase in brake cylinder pressure.

14. In a brake equipment for vehicles, in combination, a brake cylinder, magnetic track shoe braking means adapted for engagement with the track rail, an electric circuit for energizing said track shoe braking means, manually operable means for effecting the supply of fluid under pressure to said brake cylinder, switching means for effecting the energization of said track shoe braking means comprising inertia responsive switching means responsive to the rate of retardation of the vehicle and pressure responsive switching means subject to brake cylinder pressure.

15. In a brake equipment for vehicles, in combination, a brake cylinder, magnetic track shoe braking means for engagement with the track rail, manually operable means for effecting the supply of fluid under pressure to said brake cylinder, means for establishing a magnetizing circuit for said track shoe braking means comprising an inertia responsive switch responsive to a predetermined rate of retardation of the vehicle, means for establishing a braking circuit for said track shoe braking means comprising said inertia responsive switch and switch mechanism responsive to a predetermined low value of brake cylinder pressure, and means responsive to an increasing value in brake cylinder pressure for increasing the braking current to said track shoe braking means.

16. In a brake equipment for vehicles, in combination, a brake cylinder, magnetic track shoe braking means for engagement with the track rail, manually operable means for effecting the supply of fluid under pressure to said brake cylinder, means for controlling the energization of said track shoe braking means comprising a pressure operated switch responsive to brake cylinder pressure and an inertia switch responsive to the rate of retardation of the vehicle, and pressure controlled means for lowering said track shoe into engagement with the track rail upon the supply of a braking current thereto and for raising said track shoe from engagement with the track rail upon the interruption of the braking current to the track shoe.

17. In a vehicle brake system, in combination, an electric brake device, a manually operable brake controller, and inertia controlled means conditioned by operation of said brake controller to a brake applying position to establish a circuit for energizing said electric brake device and operative in response to the rate of retardation of the vehicle to maintain said circuit closed.

18. In a vehicle brake system, in combination, an electric brake device, a manually operable brake controller, and inertia controlled means conditioned by operation of said brake controller to a brake applying position to establish a circuit for energizing said electric brake device and operative in response to the rate of retardation of the vehicle to maintain said circuit closed, and operative to open said circuit below a chosen rate of retardation.

19. In a vehicle brake system, in combination, an electric brake device, a manually operable brake controller, means operable upon operation of said brake controller to any brake applying position in an application zone for establishing a circuit to said electric brake device including a fixed resistor that is designed to permit the flow of magnetizing current only therethrough, and fluid pressure controller means for establishing a braking circuit in shunt to said resistor and to control the current therethrough in accordance with the degree of operation of said brake controller in said application zone.

20. In a brake equipment for vehicles, in combination, a brake cylinder, magnetic track shoe braking means adapted for engagement with the track rails, manually operable means for effecting the supply of fluid under pressure to said brake cylinder and for establishing a magnetizing circuit for said track shoe, and means responsive to brake cylinder pressure for establishing a braking circuit for said track shoe, after the magnetizing circuit is established.

21. In a vehicle brake equipment, a magnetic track shoe brake device, means manually operative to cause application of the track shoe brake device, and inertia means responsive to the stopping of the vehicle for effecting release of the track shoe brake device independently of the manually operative means.

22. In a vehicle brake equipment, a magnetic track shoe braking means having an electromagnet, means manually operative to cause said electromagnet to be energized for a certain interval of time, and inertia means responsive to the retardation of the vehicle within said certain interval of time for preventing deenergization of said electromagnet as long as the vehicle continues in motion and effective when the vehicle stops to cause deenergization of the electromagnet.

BURTON S. AIKMAN.